United States Patent
Sorrentino (10) Patent No.: US 8,488,529 B2
(45) Date of Patent: Jul. 16, 2013

(54) EFFICIENT INFORMATION MAPPING FOR TRANSMISSION GRANTS

(75) Inventor: Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 251 days.

(21) Appl. No.: 13/152,533

(22) Filed: Jun. 3, 2011

(65) Prior Publication Data

US 2012/0170525 A1 Jul. 5, 2012

Related U.S. Application Data

(60) Provisional application No. 61/429,962, filed on Jan. 5, 2011, provisional application No. 61/431,589, filed on Jan. 11, 2011.

(51) Int. Cl.
*H04Q 7/00* (2006.01)
*H04J 3/16* (2006.01)

(52) U.S. Cl.
USPC .......................................... 370/328; 370/468

(58) Field of Classification Search
USPC ..................... 370/328, 338, 341, 437, 468
See application file for complete search history.

(56) References Cited

U.S. PATENT DOCUMENTS

| 2008/0225693 | A1* | 9/2008 | Zhang et al. ................. 370/210 |
| 2009/0073922 | A1* | 3/2009 | Malladi et al. ................ 370/328 |
| 2010/0080187 | A1 | 4/2010 | Papasakellariou et al. |
| 2010/0118787 | A1* | 5/2010 | Yano et al. .................... 370/328 |
| 2011/0110322 | A1* | 5/2011 | Koyanagi et al. ............. 370/329 |
| 2011/0199961 | A1* | 8/2011 | Narasimha et al. ........... 370/328 |

OTHER PUBLICATIONS

3rd Generation Partnership Project (3GPP), "On the Configuration of SRS-Related Parameters by DCI Format 4," 3GPP TSG RAN WG1 Meeting #63bis, R1-110454, pp. 1-4, Jan. 17-21, 2011, Dublin, Ireland.
3rd Generation Partnership Project (3GPP), Technical Specification Group Radio Access Network; Evolved Universal Terrestrial Radio Access (E-UTRA); Multiplexing and channel coding (Release 10), pp. 1-76, Mar. 29, 2011, Valbonne, FR.
3rd Generation Partnership Project (3GPP), Technical Specification Group Radio Access Network; Evolved Universal Terrestrial Radio Access (E-UTRA); LTE Physical Layer; General Description (Release 10), pp. 1-13, Dec. 2010, Valbonne, FR.

(Continued)

*Primary Examiner* — Hong Cho
(74) *Attorney, Agent, or Firm* — Coats & Bennett, P.L.L.C.

(57) ABSTRACT

Methods and apparatus for signaling an implicit signaling bit in a scheduling grant message are disclosed, including the implicit signaling of parameters related to the configuration of sounding reference signals. In various embodiments, implicit signaling is achieved by observing that certain codepoints in downlink control information formats are unused for certain scheduling assignments. The information content of certain information fields in the DCI format are redesigned to exploit this unused bandwidth, allowing the implicit signaling of one or more bits that can be used to extend the number of SRS configurations that can be specified in the DCI. In alternative embodiments, the implicit signaling concept is exploited in order to reduce the signaling payload while maintaining flexibility in dynamically assigning different SRS configurations by way of scheduling grant messages.

34 Claims, 6 Drawing Sheets

OTHER PUBLICATIONS

3rd Generation Partnership Project (3GPP), Technical Specification Group Radio Access Network; Evolved Universal Terrestrial Radio Access (E-UTRA); LTE Physical Layer; Physical layer procedures (Release 10), pp. 1-15, Mar. 30, 2011, Valbonne, FR.

Pantech, "Detailed dynamic aperiodic SRS signaling", 3GPP TSG RAN1 #63, Jacksonville, US, R1-106059, Nov. 15-19, 2010.

Panasonic, "PCFICH in cross carrier operation", 3GPP TSG-RAN WG1 #61, Montral, Canada, R1-102851, May 10-14, 2010.

Samsung, "Resources for Dynamic SRS Multiplexing", 3GPP TSG RAN WG1 #62bis, Xian, China, R1-105398, Oct. 11-15, 2010.

Texas Instruments, "DCI Format 4 Fields for Supporting UL SU-MIMO", 3GPP TSG RAN WG1 63, Jacksonville, USA, R1-105898, Nov. 15-19, 2010.

\* cited by examiner

- Precoding Information Field (PIF)
  - TPMI and TRI jointly coded as in Rel-8 DL DCI Format 2
  - 3 bits for 2Tx
    - One codeword:
      - For rank-1:
        - Codepoints 0..5 in the PIF: rank-1 TPMI (TPMI=0..5)
    - Two codewords:
      - For rank-2:
        - Codepoints 0..1 in the PIF: rank-2 (same precoder (TPMI=0) associated to both codepoints)
- TB Disabling:
  - If either (I_MCS=0, N_PRB>1); or ( I_MCS =28, N_PRB =1) is signaled
- SRS_iIE implicit signaling:
  - One codeword:
    - For rank-1:
      - If the qth TB is disabled and the corresponding NDI bit (NDI-q) is set (or toggled), then SRS_iIE =1
      - Otherwise, SRS_iIE =0.
  - Two codewords:
    - For rank-2:
      - If codepoint=0 in the PIF is selected, SRS_iIE =0
      - If codepoint=1 in the PIF is selected, SRS_iIE =1

2 TRANSMIT ANTENNAS

*FIG. 5A*

- Precoding Information Field (PIF)
  - TPMI and TRI jointly coded as in Rel-8 DL DCI Format 2
  - 6 bits for 4Tx
    - One codeword:
      - For rank-1:
        - Codepoints 0..23 in the PIF: rank-1 TPMI (TPMI=0..23)
      - For rank-2:
        - Codepoints 24..39 in the PIF: rank-2 TPMI (TPMI=0..15)
    - Two codewords:
      - For rank-2:
        - Codepoints 0..15 in the PIF (TPMI=0..15) and 29..44 in the PIF (TPMI=0..15): rank-2 TPMI (replicated twice)
      - For rank-3:
        - Codepoints 16..27 in the PIF (TPMI=0..11) and 45..56 in the PIF (TPMI=0..11): rank-3 TPMI (replicated twice)
      - For rank-4:
        - Codepoint 28 in the PIF (TPMI=0) and 57 in the PIF (TPMI=0): rank-4 (same precoder (TPMI=0) associated to both codepoints)
- TB Disabling:
  - If either (I_MCS=0, N_PRB>1); or ( I_MCS =28, N_PRB =1) is signaled
- SRS_iIE implicit signaling:
  - For one CW tx:
    - If the qth TB is disabled and the corresponding NDI bit (NDI-q) is set (or toggled), then SRS_iIE =1
    - Otherwise, SRS_iIE =0.
  - For two CWs tx:
    - If PIF codepoints=0..28, SRS_iIE=0
    - Otherwise, (SRS_iIE)=1

4 TRANSMIT ANTENNAS

EFFICIENT INFORMATION MAPPING FOR TRANSMISSION GRANTS

RELATED APPLICATIONS

This application claims priority to U.S. Provisional Application Ser. No. 61/429,962 filed 5 Jan. 2011, the entire contents of which are incorporated by reference herein. This application also claims priority to U.S. Provisional Application Ser. No. 61/431,589, filed 11 Jan. 2011, the entire contents of which are also incorporated by reference herein.

TECHNICAL FIELD

This application relates generally to the control of devices in wireless communication networks, and more particularly relates to techniques for efficient signalling of reference signal configurations in LTE systems.

BACKGROUND

Multi-antenna techniques can significantly increase the data rates and reliability of a wireless communication system. In particular, throughput and reliability can be drastically improved, in at least some radio environments, if both the transmitter and the receiver are equipped with multiple antennas. This arrangement results in a so-called multiple-input multiple-output (MIMO) communication channel; such systems and related techniques are commonly referred to as MIMO systems and MIMO techniques.

The LTE-Advanced standard is currently under development by the 3rd-Generation Partnership Project (3GPP). A core component in LTE-Advanced is the support of MIMO antenna deployments and MIMO related techniques for both downlink communications, i.e., base station to mobile station transmissions, and uplink communications, i.e., mobile station to base station transmissions. More particularly, a spatial multiplexing mode for uplink communications, referred to as single-user MIMO, or "SU-MIMO", is under development. SU-MIMO is intended to provide mobile stations, called user equipment, or "UEs" in 3GPP terminology, with very high uplink data rates in favorable channel conditions.

SU-MIMO consists of the simultaneous transmission of multiple spatially multiplexed data streams within the same frequency bandwidth. Each of these multiplexed data streams is usually referred to as a "layer." Multi-antenna techniques such as linear precoding are employed at the UE's transmitter in order to differentiate the layers in the spatial domain and to allow the recovering of the transmitted data at the receiver of the base station, which is known as an eNodeB, or eNB, in 3GPP terminology.

Another MIMO technique supported by LTE-Advanced is MU-MIMO, where multiple UEs belonging to the same cell are completely or partly co-scheduled in the same bandwidth and during the same time slots. Each UE in a MU-MIMO configuration may transmit multiple layers, thus operating in SU-MIMO mode.

To enable detection of all of the spatially-multiplexed data streams, the receiver must estimate an effective radio channel for each transmitted layer in the cell. Therefore, each UE needs to transmit a unique reference signal (RS) at least for each transmitted layer. The receiver, which is aware of which reference signal is associated to each layer, performs estimation of the associated channel by performing a channel estimation algorithm using the reference signal. The estimated channel is an "effective" channel because it reflects the mapping of the spatially multiplexed layer to multiple antennas. The estimate of the effective channel response is then employed by the receiver in the detection process.

Orthogonal Frequency-Division Multiplexing (OFDM) technology is a key underlying component of LTE. As is well known to those skilled in the art, OFDM is a digital multi-carrier modulation scheme employing a large number of closely-spaced orthogonal sub-carriers. Each sub-carrier is separately modulated using conventional modulation techniques and channel coding schemes. In particular, 3GPP has specified Orthogonal Frequency Division Multiple Access (OFDMA) for the downlink transmissions from the base station to a mobile terminal, and single carrier frequency division multiple access (SC-FDMA) for uplink transmissions from a mobile terminal to a base station. Both multiple access schemes permit the available sub-carriers to be allocated among several users.

SC-FDMA technology employs specially formed OFDM signals, and is therefore often called "pre-coded OFDM" technology. Although similar in many respects to conventional OFDMA technology, SC-FDMA signals offer a reduced peak-to-average power ratio (PAPR) compared to OFDMA signals, thus allowing transmitter power amplifiers to be operated more efficiently. This in turn facilitates more efficient usage of a mobile terminal's limited battery resources. (SC-FDMA is described more fully in Myung, et al., "Single Carrier FDMA for Uplink Wireless Transmission," *IEEE Vehicular Technology Magazine*, vol. 1, no. 3, September 2006, pp. 30-38.)

LTE link resources are organized into "resource blocks," defined as time-frequency blocks with a duration of 0.5 milliseconds, corresponding to one "slot", or half a sub-frame, and encompassing a bandwidth of 180 kHz, corresponding to 12 sub-carriers with a spacing of 15 kHz. Of course, the exact definition of a resource block may vary between LTE and similar systems, and the inventive methods and apparatus described herein are not limited to the numbers used herein. In general, however, resource blocks may be dynamically assigned to mobile terminals, and may be assigned independently for the uplink and the downlink. Depending on a mobile terminal's data throughput needs, the system resources allocated to it may be increased by allocating resource blocks across several sub-frames, or across several frequency blocks, or both. Thus, the instantaneous bandwidth allocated to a mobile terminal in a scheduling process may be dynamically adapted to respond to changing conditions.

LTE also employs multiple modulation formats, including at least QPSK, 16-QAM, and 64-QAM, as well as advanced coding techniques, so that data throughput may be optimized for any of a variety of signal conditions. Depending on the signal conditions and the desired data rate, a suitable combination of modulation format, coding scheme, and bandwidth is chosen, generally to maximize the system throughput. Power control is also employed to ensure acceptable bit error rates while minimizing interference between cells.

Efficient utilization of the air interfaces is a key goal of the LTE developers. An important advantage of OFDM technologies is the flexibility with which resources may be allocated, or "scheduled", among multiple users. Theoretically, sub-carriers may be allocated by a base station to mobile terminals on an individual basis or in groups; in practice, allocations are typically made on a resource block basis. A variety of scheduling algorithms have been proposed for solving the problem of simultaneously serving multiple users in LTE systems. In general terms, scheduling algorithms are used as an alternative to first-come-first-served queuing and transmission of data packets. As is well known to those skilled in the art, simple scheduling algorithms include round-robin, fair queuing, and proportionally fair scheduling. If differentiated or guaranteed quality of service is offered, as opposed to best-effort communication, weighted fair queuing may be utilized.

Channel-dependent scheduling may be used to take advantage of favorable channel conditions to increase throughput and system spectral efficiency. For example, in an OFDM system, channel quality indicator (CQI) reports, which typically indicate the signal-to-noise ratio (SNR) or signal-to-noise-plus-interference ratio (SINR) measured or estimated for a given channel, may be used in channel-dependent resource allocation schemes. The simplest scheme, conceptually, is to select a mobile terminal having a highest priority, whether based on fairness, quality-of-service guarantees, or other decision metric, and to allocate some number of subchannels with the highest measured or estimated SINRs to the selected mobile terminal. This approach exploits the frequency diversity inherent to a multi-user OFDM system. Since different mobile terminals observe different frequency-dependent fading profiles, channel-dependent scheduling tends to allocate portions of the overall available bandwidth in a more efficient manner than arbitrary allocation of bandwidth chunks.

SUMMARY

Methods and apparatus are disclosed for signaling control information in a wireless communication network, where one network node transmits data to another according to scheduling grant messages received from the other node. In various embodiments, an implicit signaling bit is encoded into the scheduling grant message.

More particularly, several embodiments of the present invention employ implicit signaling of parameters related to the configuration of sounding reference signals (SRS), to increase the flexibility of SRS configuration by the network without increasing the payload size of the downlink control information (DCI) used by the network to configure mobile devices. In various embodiments, implicit signaling of an additional bit for SRS configuration is achieved by observing that certain codepoints in the DCI formats are unused for certain scheduling assignments. The information content of certain information fields in the DCI format can then be redesigned to exploit this unused bandwidth, allowing the implicit signaling of one or more bits that can be used to extend the number of SRS configurations that can be specified in the DCI. In several alternative embodiments of the invention, the implicit signaling concept is exploited in order to reduce the signaling payload while maintaining the currently proposed flexibility in dynamically assigning different SRS configurations by way of scheduling grant messages.

An example method according to some embodiments of the invention begins with the selection of a reference symbol configuration, such as a configuration for sounding reference signals. The reference symbol configuration may comprise a plurality of parameters defining a reference symbol transmission by the remote device. Next, a value for an implicit signaling bit is determined from the selected reference symbol configuration. In some embodiments, there are several pre-determined reference symbol configurations from which one is selected—one of two or more bits indexing these configurations is designated as the implicit signaling bit, while the remaining bits are explicitly signaled. In other embodiments, the implicit bit value is determined directly from a particular reference symbol configuration parameter, such as a transmission comb selection for the reference symbol transmission, a starting physical resource block assignment for the reference symbol transmission, a duration for the transmission, an index value corresponding to a periodicity and/or subframe offset for the transmission, a frequency hopping bandwidth for the reference symbol transmission, a cyclic shift for the reference symbol transmission, and a number of transmitter antenna ports for the reference symbol transmission.

The method continues by determining whether one of the two (or more) possible transport blocks is to be disabled by the upcoming scheduling grant message. If so, then a new-data-indicator (NDI) bit corresponding to the disabled transport block is used for signaling the implicit bit value. In some embodiments, the implicit bit value is mapped directly to the NDI bit. In others, the NDI bit is toggled, relative to a prior value, to indicate one value of the implicit bit, and left the same to indicate the opposite value.

If a transport block is not to be disabled by the upcoming scheduling grant message, then the implicit bit is jointly encoded with a precoder matrix identifier (PMI), to take advantage of otherwise unused codepoints in the coding of the PMI.

Finally, the scheduling grant message is sent to the remote device for decoding of the implicit bit. Because the remote device can determine from the scheduling grant whether a transport block was disabled or not, the remote device can easily reverse the implicit bit encoding process to recover the implicit signaling bit.

Corresponding processes for decoding the implicit bit from the scheduling grant message are also disclosed. An example process begins with the receipt of a scheduling grant message. In some instances, for example, this scheduling grant message may comprise scheduling information formatted according to the downlink control information (DCI) Format 4, as specified by the 3GPP standards.

Next, the network node that receives the scheduling grant determines, from the scheduling grant message, whether the transmission of one of two (or more) possible transport blocks is disabled. If a transport block is disabled, then the value of the implicit bit is mapped from the new-data-indicator (NDI) bit corresponding to the disabled transport block. The value of the NDI bit may map directly to the implicit signaling bit value, in some embodiments, while in other embodiments the value of the implicit bit depends on whether the NDI bit value has been toggled relative to its previous value.

If no transport block is disabled, on the other hand, then the implicit bit is derived from the precoder identifier field of the scheduling grant. In this case, the implicit bit has been jointly coded with the precoder matrix identifier.

In some embodiments, the implicit bit value is used to select a reference symbol configuration. In some of these embodiments, the reference symbol configuration may be selected from a pre-determined set of reference symbol configurations, each corresponding to an index of at least two bits, where the implicit signaling bits corresponds to one of those bits. In some cases, the pre-determined set of reference symbol configurations may have been determined earlier, via higher layer control signaling from the remote device.

In addition to the methods summarized above, several variants are disclosed and described in further detail in the following detailed description. Apparatus adapted to carry out these and related techniques are also disclosed. These apparatus include wireless transceivers configured for use in base stations, such as LTE eNodeBs, and wireless transceivers configured for use in mobile stations, such as LTE UEs.

Of course, the present invention is not limited to the features and advantages summarized above. Indeed, those skilled in the art will recognize additional features and advantages of the present invention upon reading the following detailed description, and upon viewing the accompanying drawings.

DETAILED DESCRIPTION

Various embodiments of the present invention are now described with reference to the drawings, wherein like reference numerals are used to refer to like elements throughout. In the following description, numerous specific details are set forth for purposes of explanation, in order to provide a thorough understanding of one or more embodiments. It will be evident to one of ordinary skill in the art, however, that some embodiments of the present invention may be implemented or practiced without one or more of these specific details. In other instances, well-known structures and devices are shown in block diagram form in order to facilitate describing embodiments.

Note that although terminology from 3GPP LTE-Advanced is used throughout this disclosure to exemplify the invention, this should not be seen as limiting the scope of the invention to only the aforementioned system. Other wireless systems including or adapted to include multi-layer transmission techniques may also benefit from exploiting the ideas covered within this disclosure.

Also note that terminology such as "base station," "eNodeB," "mobile station," and "UE" should be considered non-limiting as applied to the principles of the invention. In particular, while detailed proposals applicable to the uplink in LTE-Advanced are described here, the described techniques may be applied to the downlink in other contexts. Thus, in general the base station or eNodeB in the discussion that follows may be considered more generically as "device 1" and the mobile station or "user equipment" (UE) considered as "device 2," in some circumstances, with these two devices comprising communication nodes, or communication stations, communicating with each other over a radio channel.

Figure 1:
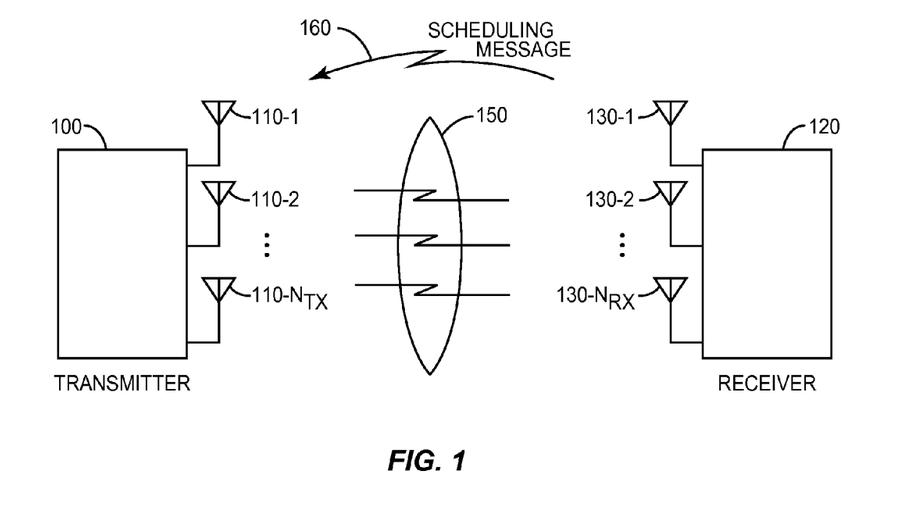
FIG. 1 illustrates components of an exemplary wireless communications link.

This is shown in FIG. 1, which illustrates components of a wireless link between a transmitter 100, which has multiple antennas 110-1 to 110-$N_{TX}$, and a receiver 120, which also has multiple antennas, labeled 130-1 to 130-$N_{RX}$. $N_{TX}$ and $N_{RX}$ may be the same, or different. The number of spatially multiplexed layers that may be transmitted over complex radio channel 150 is limited to the smaller of $N_{TX}$ and $N_{RX}$, and may be further limited by the channel conditions.

In an LTE system, the transmitter 100 of FIG. 1 corresponds to a UE, which receives scheduling messages 160 from an eNodeB, corresponding to receiver 120 of FIG. 1. These scheduling messages direct the UE (transmitter 100) to transmit using specified time-frequency resources, specified modulation and coding schemes, and, depending on channel conditions, according to specified multi-antenna transmission techniques.

Practical embodiments of the techniques to be described below will include signaling methods, as might be practiced by transmitter device 100 or receiver device 120, or more specifically, by an LTE base station or UE. Other embodiments of these techniques will include the devices themselves. In particular, the techniques described below can be implemented in a wireless transceiver apparatus such as the one pictured in FIG. 2, which illustrates a few of the components relevant to the present techniques, as realized in either a mobile station or a base station. While the complexity of a radio base station such as an LTE eNodeB will generally be far greater than that of a UE, the basic building blocks for each are similar, and those familiar with wireless transceiver design for wide-area wireless networks will readily appreciate how the signaling techniques disclosed herein may be applied to either.

Figure 2:
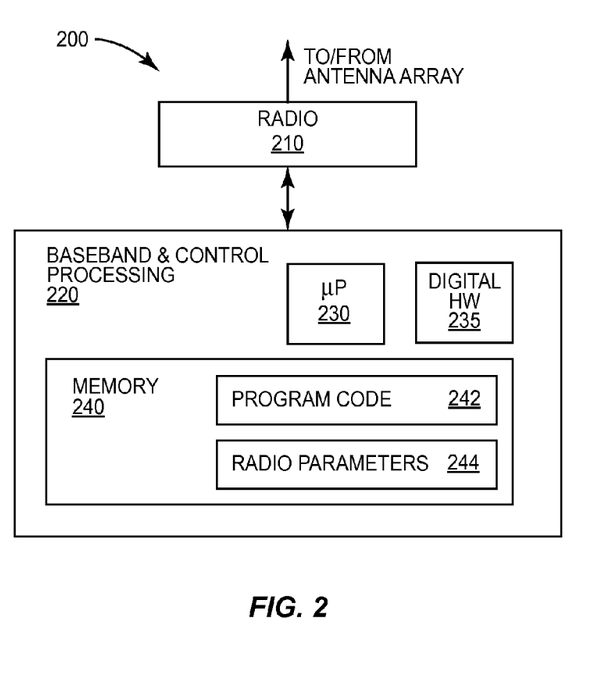
FIG. 2 is a block diagram illustrating components of a wireless node, such as a mobile station or a base station, according to several embodiments of the present invention.

The pictured apparatus 200 includes radio circuitry 210 as well as baseband and control processing circuit 220. Radio circuitry 210 includes receiver circuits and transmitter circuits that use known radio processing and signal processing components and techniques, typically according to a particular telecommunications standard such as the 3GPP standard for LTE-Advanced. Because the various details and engineering tradeoffs associated with the design of such circuitry are well known and are unnecessary to a full understanding of the invention, additional details are not shown here. Baseband and control processing circuit 220 includes one or more microprocessors or microcontrollers 230, as well as other digital hardware 235, which may include digital signal processors (DSPs), special-purpose digital logic, and the like. Either or both of microprocessor(s) 230 and digital hardware may be configured to execute program code 242 stored in memory 240, along with radio parameters 244. Again, because the various details and engineering tradeoffs associated with the design of baseband processing circuitry for mobile devices and wireless base stations are well known and are unnecessary to a full understanding of the invention, additional details are not shown here.

The program code 242 stored in memory circuit 240, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the signaling techniques described herein, in several embodiments. Radio parameters 244 may include one or more pre-determined tables or other data relating control bits to transmission configurations, so that a transmitting station and a corresponding receiving station will have a mutual understanding of the transmission configuration to be used in any given situation. More particularly, as will be explained more clearly in the discussion that follows, the radio parameters 244 may include one or more pre-determined tables or other data relating SRS control bits (both implicit and explicit) to SRS transmission configurations, so that a base station and corresponding UE will have a mutual understanding of the SRS transmission configuration to be used at a given time.

In addition to supporting multi-antenna transmission, UEs designed for LTE-Advanced need to be able to operate using a transmission scheme that is compatible with non-MIMO enhanced networks, i.e., with single-antenna transmission. Such a scheme is important both for backwards compatibility reasons and because single-antenna transmission may be most suitable in some situations, such as for UEs with poor channel conditions, as might occur when a UE is near a cell's boundary.

In an LTE network, the eNodeB commands the transmission schemes to be adopted by the UEs, according to scheduling decisions made by the eNodeB. These decisions are communicated to the UEs by use of downlink control information (DCI) that is carried by the downlink control channel (PDCCH).

More specifically, DCI includes downlink scheduling assignments, including, for example, a Physical Downlink Shared Channel (PDSCH) resource indication, a transport format, hybrid-ARQ information, and control information related to spatial multiplexing, when applicable. A downlink scheduling assignment also includes a command for power control of the Physical Uplink Control Channel (PUCCH). DCI also includes uplink scheduling grants, including a Physical Downlink Shared Channel (PUSCH) resource indication, transport format (e.g., an index to a predefined table of Modulation and Coding Schemes, or MCS), hybrid-ARQ related information and control information related to spatial multiplexing (if applicable). An uplink scheduling grant also includes a command for power control of the PUSCH uplink physical channel. DCI may also include power-control commands for a set of terminals, as a complement to the commands included in the scheduling assignments/grants.

The different types of control information above, which are transmitted at different times, typically correspond to different DCI message sizes. For example, supporting spatial multiplexing with non-contiguous allocation of resource blocks in the frequency domain requires a larger scheduling message, compared to an uplink grant allowing for frequency-contiguous allocations only. The downlink control information is therefore categorized into different DCI formats, where each format corresponds to a certain message size and usage. The actual message size depends on the cell bandwidth, since for larger bandwidths a larger number of bits is required to indicate the resource block allocation.

One PDCCH carries one message with one of the supported DCI formats. Since multiple terminals can be scheduled simultaneously, on both downlink and uplink, there must be a possibility to transmit multiple scheduling messages within each subframe. Each scheduling message is transmitted on a separate PDCCH; consequently there are typically multiple simultaneous PDCCH transmissions within each cell. Furthermore, to support different radio-channel conditions, link adaptation, where the code rate of the PDCCH is selected to match the radio-channel conditions, can be used. Thus, there will be multiple PDCCH formats where the PDCCH format to use depends on the DCI format and on the code rate used for the PDCCH transmission.

Uplink scheduling grants use at least two different DCI formats: DCI format 0 for single antenna transmission and DCI format 4 for multi-antenna operations. Non-contiguous resource block allocations are supported for both DCI formats 0 and 4, while spatial multiplexing from a single terminal (SU-MIMO) is supported only for DCI format 4.

A scheduled PUSCH transmission from a UE is achieved by transmission of up to two parallel coded transport blocks, each of them associated with an independent HARQ process. Because the HARQ processes for these transport blocks are independent, it is possible to individually retransmit each transport block and to assign transport block-specific parameters such as the modulation and coding scheme (MCS).

DCI Format 0 (DCI-0)—DCI format 0 has the same size for the control signaling message as the "compact" downlink assignment (DCI format 1A). A flag in the message is used to inform the terminal whether the message is an uplink scheduling grant (DCI format 0) or a downlink scheduling assignment (DCI format 1A). Some of the information fields of DCI format 0 include:

Format 0/1A indication [1 bit], used to differentiate between DCI format 1A and DCI format 0, since the two formats have the same message size.

Hopping flag [1 bit], indicating whether or not uplink frequency hopping is to be applied to the uplink PUSCH transmission.

Resource-block allocation. This field indicates the resource blocks upon which the terminal should transmit the PUSCH. The length of this field varies, depending on the configured bandwidth.

Modulation and coding scheme (MCS) including redundancy version [5 bits], used to provide the terminal with information about the modulation scheme, the code rate and the transport-block size. For the uplink, the signaling of the transport-block size uses the same transport-block table as for the downlink, i.e., the modulation-and-coding scheme together with the number of scheduled resource blocks provides the transport-block size.

New-data indicator (NDI) [1 bit], used to clear the soft buffer for initial transmissions.

Phase rotation of the uplink demodulation reference-signal [3 bits]. Multiple terminals can be scheduled to transmit upon the same set of resource blocks, but if the uplink demodulation reference signals are distinguishable through different phase rotations, the eNodeB can estimate the uplink channel response from each terminal and suppress the inter-terminal interference by the appropriate processing. This is sometimes referred to as multi-user MIMO (MU-MIMO).

Channel-status request flag [1 bit]. The network can explicitly request an aperiodic channel-status report by setting this bit in the uplink grant.

Uplink index [2 bits]. This field is present only when operating in TDD and is used to signal for which uplink subframe the grant is valid.

Transmit-power control for PUSCH [2 bits].

Identity (RNTI) of the terminal for which the PDSCH transmission is intended [16 bits]. The identity is not explicitly transmitted but implicitly included in the CRC calculation.

Non-continuous resource allocation flag.

There is no explicit signaling of the redundancy version in the uplink scheduling grants. This is motivated by the use of a synchronous hybrid-ARQ protocol in the uplink; retransmissions are normally triggered by a negative acknowledgement on the PHICH and not explicitly scheduled as for downlink data transmissions. Nevertheless, there is still a possibility to explicitly schedule retransmissions. This is useful in situations where the network wishes to explicitly move the retransmission in the frequency domain, and is done by using the PDCCH instead of the PHICH. Three values of the modulation and coding field are reserved to mean redundancy versions one, two and three. If one of those values are signaled, the terminal should assume that the same modulation and coding as the original transmission is used. The remaining entries are used to signal the modulation and coding scheme to use and also imply that redundancy version zero should be used. The difference in usage of the reserved values compared to the downlink scheduling assignments means that the modulation scheme cannot change between uplink (re)transmission attempts. This is different than in the downlink case.

The time between reception of an uplink scheduling grant on a PDCCH and the corresponding transmission on the uplink-SCH is fixed. For FDD, the time relation is the same as for PHICH, that is, an uplink grant received in downlink subframe n applies to uplink subframe n+4. The reason for having the same timing relation as for PHICH is that this provides the possibility to override the acknowledgment on PHICH with a scheduling grant on PDCCH. For TDD, such a time relation is not possible, since subframe n+4 may not be an uplink subframe. Therefore, for some downlink-uplink configurations, the delay between the reception of an uplink scheduling grant and the actual transmission differs between subframes, depending on the subframe in which the uplink scheduling grant was received. Furthermore, in one of the downlink-uplink asymmetries for TDD, configuration 0, there are more uplink subframes than downlink subframes, i.e., three uplink subframes versus two downlink subframes. Therefore, there is a need to be able to schedule multiple uplink subframes in one downlink subframe; if this was not possible then it would be impossible to schedule all uplink subframes in some configurations. Consequently, a two-bit uplink index field is part of the uplink scheduling grant in TDD mode. The index field specifies to which uplink subframe a grant received in a downlink subframe applies.

DCI Format 4 (DCI-4)—The details regarding the content and encoding of DCI format 4 are under discussion by 3GPP. The working assumption is that DCI format 4 is used for the scheduling of PUSCH in one uplink cell with multi-antenna port transmission mode, and that the downlink cell from which PUSCH assignments for a given uplink cell originate is configured by higher layers.

A number of information elements (IEs) are transmitted by means of the DCI format 4 including, for example, control information regarding uplink radio resources assignment, uplink power control, reference signals assignment for demodulation of uplink data transmission, frame structure configuration for flexible TDD and FDD modalities and triggering of uplink reports regarding properties of the radio channel and/or the recommended format for downlink transmissions. Additional details about DCI-4 are present in 3GPP documentation, including in documents R1-106556, "Introduction of Rel-10 LTE-Advanced features in 36.212," and R1-106557, "Introduction of Rel-10 LTE-Advanced features in 36.213," available via http://www.3gpp.org.

Furthermore, DCI-4 is used to assign the transport format for uplink data transmission on PUSCH. The transmission of either one or two codewords can be scheduled on PUSCH in the same subframe, where each codeword is simply a coded and modulated transport block. It is thus necessary to specify the transport format for up to two transport blocks for each PUSCH transmission, i.e., for each DCI-4. In the event that only a single transport block is employed (e.g., for rank-1 PUSCH), it is also necessary to indicate which transport block is employed. Further, since each transport block might possibly contain either the retransmission of a previously scheduled transport block or new data, a new-data indicator (NDI) information element is associated with each transport block. Thus, two NDI bits are used.

The resources assignment in frequency domain is common to both codewords on PUSCH, and is determined by an N_PRB field in DCI-4. This field indicates the common number of resource blocks (i.e., the scheduled bandwidth) for both codewords on the corresponding PUSCH transmission. The transport format assignment is performed by use of a 5-bit transport block-specific referred to herein (and in the 3GPP specifications) as the I_MCS(b) field, where b indicates the transport block index.

In order to reduce the payload of DCI-4 and provide a compact signaling procedure for transport block selection, which is equivalent to transport block disabling, in the event only a single transport block is used, the disabled transport block index is obtained from the MCS and resource allocation for PUSCH. More particularly, if either (I_MCS(b)=0 and N_PRB>1); or (I_MCS(b)=28 and N_PRB=1) is signaled, then the corresponding transport block b is disabled.

DCI-4 is also able to trigger Sounding Reference Signals (SRS) in the uplink and to configure certain associated properties. SRS are transmitted in the uplink either in a periodic or aperiodic fashion, and are intended to provide additional reference signals for estimating some radio channel properties. This additional reference signal information is especially important in determining which multi-antenna transmission techniques may be used, as well as the coding and modulation schemes that should be applied to the transmitted data.

Another information element included in DCI-4 is rank/precoder information for the corresponding PUSCH transmission. Rank Index (TRI) and precoder matrix index (TPMI) are jointly encoded. Table 1 shows the TPMI configurations and rank indications that must be supported by the codebook, for UEs having two or four antenna ports (referred to as 2tx and 4tx UEs).

TABLE 1

| TPMI codebook lengths for 2 and 4 antenna ports | | |
| --- | --- | --- |
| Transmission rank | Number of supported TPMI values (2 antenna ports) | Number of supported TPMI values (4 antenna ports) |
| 1 | 6 | 24 |
| 2 | 1 | 16 |
| 3 | Not applicable | 12 |
| 4 | Not applicable | 1 |

In the case of a UE having two antenna ports, the TRI/TPMI is defined as a 3-bit field (one codepoint is reserved) while in the case of a UE having four antenna ports a 6-bit TRI/TPMI field is defined.

In order to achieve a convenient compromise between resource allocation flexibility and compactness of the associated signaling, it is defined that single transport block transmission is supported only for rank-1 (2tx and 4 tx) and rank-2 (only for 4tx), while simultaneous transmission of two transport blocks is supported for rank-2, rank-3 and rank-4.

Figure 3:
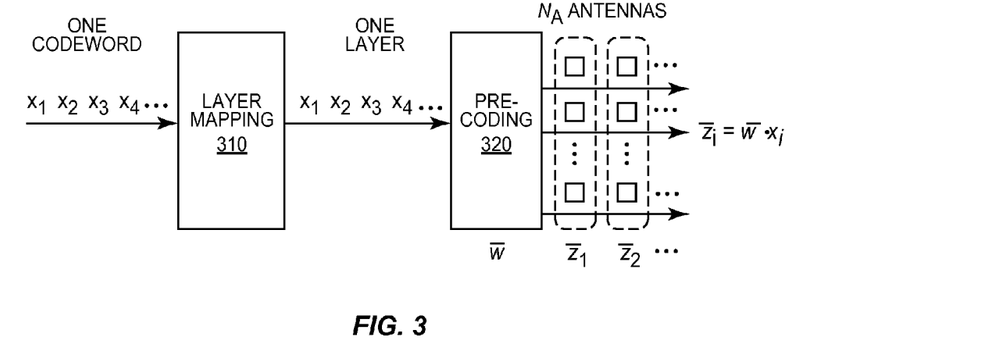
FIG. 3 illustrates the mapping of symbols to multiple transmitter antennas for a single-layer transmission.

In LTE, the mapping of data to antennas is actually a two-step process, including layer mapping and pre-coding. FIG. 3 illustrates how one codeword (corresponding to one transport block) is mapped to a single transmission layer, at layer mapping block 310. This single layer is in turn mapped to multiple transmit antennas, at pre-coding block 320, for rank-1 transmission. This multi-antenna technique is essentially a beam-forming approach.

Figure 4:
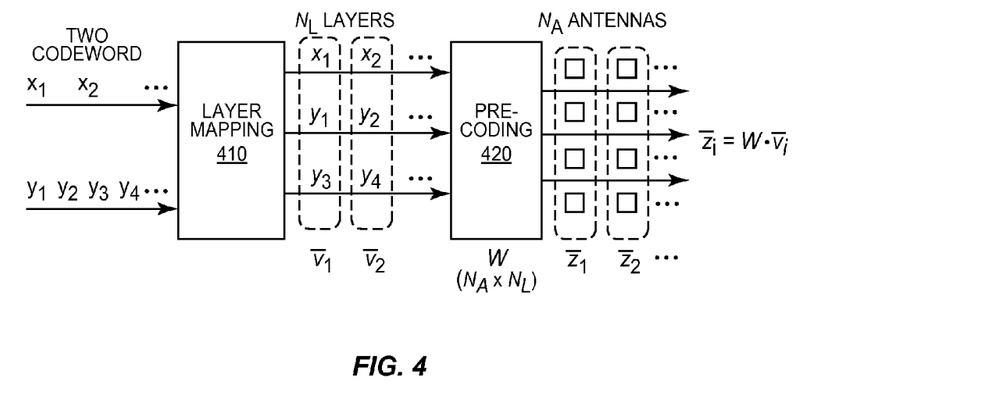
FIG. 4 illustrates the mapping of symbols to multiple transmitter antennas for a multi-layer transmission.

It is also possible for a single transport block to be mapped to two layers, for rank-2 transmission over two antennas, e.g., using Space-Frequency Block Coding. (This configuration is not illustrated.) Spatial multiplexing of two or more layers, constructed from two codewords, is also possible. FIG. 4 illustrates a spatial multiplexing configuration in which two codewords (corresponding to two transport blocks) are mapped to multiple layers, at layer mapping block 410. These layers are in turn mapped to multiple antennas (the number of antennas must at least equal the number of layers) at precoding block 420, for rank-2, rank-3, or rank-4 transmission. In FIG. 4, rank-3 transmission, using four antenna ports, is shown.

Given this flexibility in how resources may be scheduled for multi-antenna UEs, there are several shortcomings of the proposed DCI formats described above. First, according to existing proposals only three different SRS configurations may be signaled through DCI-4, besides the default "disable SRS" configuration. (A set of available SRS configurations is pre-set by higher layer signaling.) This is a severely limited flexibility in SRS allocation. Such a limited flexibility affects, for example, freedom in scheduling assignments, which in turn has a possible negative impact on system throughput and latency. Furthermore, the lack of sufficient configurability of SRS may limit the information about the radio channel that is available to the eNodeB, which is responsible for scheduling. This could potentially lead to reduced performance in both the downlink and in the uplink.

Second, the payload size of DCI-4 according to current proposals is already large and cannot be further extended without impact on several critical aspects. In particular, larger DCI payloads imply a smaller coding gain for DCI, resulting in reduced coverage for control signaling. This clearly should be avoided, since the availability of reliable control information at cell edge is of paramount importance for efficient network design. Another negative consequence of large DCI payload size is the reduced DCI multiplexing capacity on the DL control channel (PDCCH), which may result in unnecessarily limited system performance.

A natural approach to extend the flexibility in the configuration of SRS is to simply provide additional signaling bits in the DCI format to allow the explicit signaling of additional SRS configurations. However, for the reasons given above, this straightforward solution is not desirable because of the negative impacts on DCI coverage and capacity.

Another approach, detailed further below, uses implicit signaling of parameters related to the configuration of SRS, without increasing the DCI payload. In various embodiments, implicit signaling of an additional bit for SRS configuration is achieved by observing that certain codepoints in the DCI formats are unused for certain scheduling assignments. The information content of certain information fields in the DCI format can then be redesigned to exploit this unused bandwidth, allowing the implicit signaling of one or more bits that can be used to extend the number of SRS configurations that can be specified in the DCI. In several alternative embodiments of the invention, the implicit signaling concept is exploited in order to reduce the signaling payload while maintaining the currently proposed flexibility in dynamically assigning different SRS configurations by DCI-4.

In order to support improved signaling flexibility for SRS, some unused codepoints in the DCI format definition may be exploited. First, it is observed that for 2-tx antenna UEs, only single-codeword transmission is supported for rank-1, while for 4-tx antenna UEs single-codeword transmission is supported only for rank-1 and rank-2. In the case of single-codeword transmission, the index of the transport block to be mapped to the codeword is signaled by a combination of the MCS index and the physical resource block (PRB) size. However, even in case of single-codeword transmission, 2 independent NDI bits are provided in the DCI format. Thus, one of these NDI bits is unused in the event of single-codeword transmission. Finally, it is observed that the precoder codebook size is a function of the transmission rank, and that the codepoints available for precoder signaling are not fully exploited for certain combinations of transmission rank and number of transmit antennas.

Accordingly, in some embodiments of the invention the currently proposed scheduling and assignment flexibility for SRS is maintained. However, signaling overhead for DCI-4 is reduced, compared to conventional solutions, by implicitly signaling the SRS configuration by means of joint encoding of the PMI field, the transport block selection information and the NDI bit.

As an example, the four available SRS configurations to be dynamically signaled by means of DCI-4 are indicated by use of a single explicit bit in DCI-4 ((SRS_eIE)) and one implicit bit ((SRS_iIE)) derived as a function of, for example, the number of transmit antennas, the transmission rank, the selected transport block index, and the NDI information elements associated to each transport block.

Figure 5A:
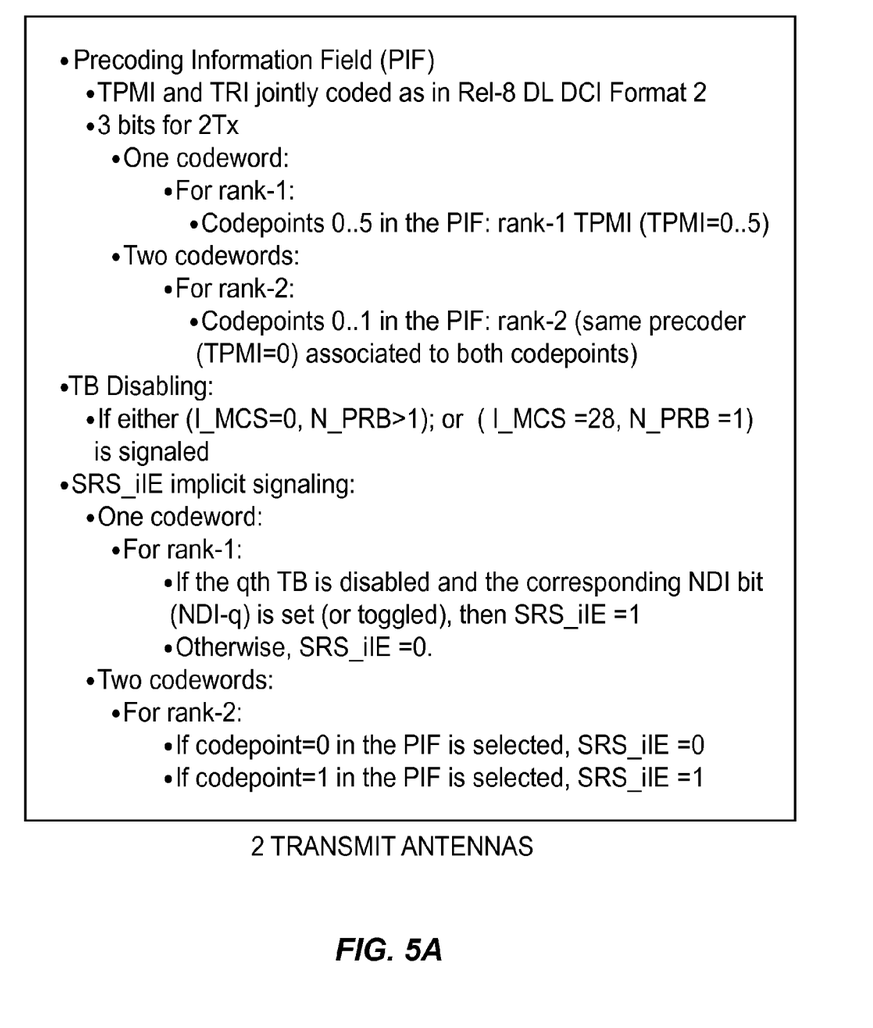
FIGS. 5A and 5B illustrate the details of a function for encoding an implicit signaling bit in a DCI Format 4 scheduling grant.
Figure 5B:
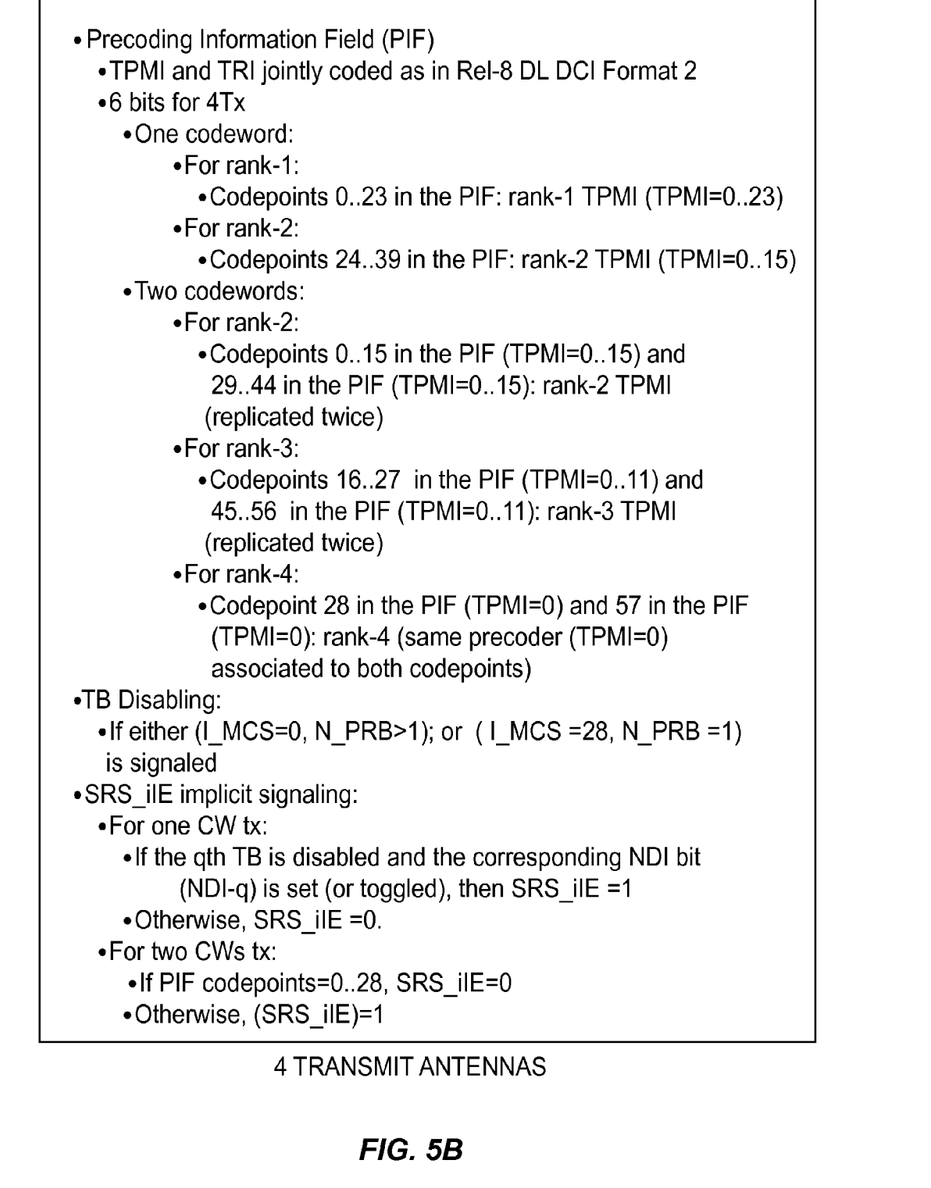

FIGS. 5A and 5B illustrate one example of a mapping function that defines an implicit bit (SRS_iIE) that controls SRS allocation for DCI-4, for two transmit antennas and four transmit antennas respectively.

Referring first to FIG. 5A, a Precoding Information Field (PIF) is first defined, for the case of 2 transmit antennas. The transmit precoding matrix indicator (TPMI) and transmit rank indicator (TRI) are jointly coded, in the same fashion specified for DCI Format 2 in Release 8 of the 3GPP Specifications (specifically, 3GPP TS 36.212, Release 8). DCI Format 2 in Release 8 specifies a PIF for a downlink transmission. Here, corresponding information is encoded to specify an uplink transmission by a two-antenna UE. For the two-antenna case, the PIF is three bits. If one codeword is to be transmitted, then only rank-1 transmission is supported for the two-antenna case. Thus, codepoints 0 to 5 correspond to the five rank-1 TPMI values (TPMI=0.5). Likewise, if two codewords are to be transmitted, this implies rank-2 transmission. In this case, only codepoints 0 to 1 in the PIF are used, as detailed below, but the same precoder (TPMI=0) is associated with both codepoints.

Transport block disabling is signaled through a combination of the modulation and coding scheme (MCS) field and the number of physical resource blocks (PRBs) signaled in the DCI. Specifically, if either (I_MCS=0 and N_PRB>1) or (I_MCS=28 and N_PRB=1) is signaled, then one transport block is disabled, indicating that only one codeword is being transmitted, and implicitly defining which PIF field codepoints are applicable.

An implicit bit, which may be used to extend the SRS signaling, can be derived from the DCI. In particular, in the one-codeword case, one of the transport blocks is disabled. However, a corresponding NDI bit is still transmitted. The value of that NDI bit can be mapped directly (or inversely) to the value of the implicit bit. Thus, for example, if that NDI bit is set (to a value of one), then the implicit SRS bit (SRS_iIE) is also set. Alternatively, the value of that NDI bit can be compared to its previous value, such that a change in value (a toggle) sets the implicit SRS bit.

In the two-codeword case, the implicit bit is derived from the PIF codepoint. For example, if codepoint 0 is signaled, then SRS_iIE equals zero. If codepoint 1 is signaled, then SRS_iIE equals one.

FIG. 5B illustrates an example encoding of an implicit bit, which again may be used to extend SRS signaling, for the four-antenna case. As with the two-antenna case, a PIF is first defined. Once again, TPMI and TRI are jointly coded in the same manner used for Release 8 DCI Format 2. For the four-antenna case, this means that six bits are used.

In the four-antenna case, transmission of one codeword may be either rank-1 or rank-2. For rank-1 transmission, codepoints 0 to 23 of the PIF are used to indicate the TPMI and TRI combination; the allowed TPMI indices are 0 to 23. For rank-2 transmission, codepoints 24 to 39 are used; the allowed TPMI indices are 0 to 15. For two codeword transmission, transmission may be rank-2, rank-3, or rank-4. In the two-codeword case, codepoints 0 to 15 and 29 to 44 are used for rank-2 transmission; the allowed TPMI indices are 0 to 15, each of which may be signaled by two distinct codepoints. Codepoints 16 to 27 and 45 to 56 are used for rank-3 transmission; the allowed TPMI indices are 0 to 11, each of may be signaled by either of two distinct codepoints. Finally, codepoints 28 and 57 are used to signal rank-4 transmission; the same precoder (TPMI=0) is associated with both of these codepoints.

It can be seen from the above PIF encoding that if the number of codewords are known, then the rank of the transmission and the precoding matrix identifier can be determined from the signaled codepoint. Transport block disabling is signaled in the same defined for the two-antenna case, i.e., through a combination of the modulation and coding scheme (MCS) field and the number of physical resource blocks (PRBs) signaled in the DCI. Specifically, if either (I_MCS=0 and N_PRB>1) or (I_MCS=28 and N_PRB=1) is signaled, then one transport block is disabled, indicating that only one codeword is being transmitted (and implicitly defining the PIF field).

For one-codeword transmission, the implicit bit is derived in the same way described above for the two-antenna case. Once again, in the one-codeword case, one of the transport blocks is disabled. However, a corresponding NDI bit is still transmitted. The value of that NDI bit can be mapped directly (or inversely) to the value of the implicit bit. Thus, for example, if that NDI bit is set (to a value of one), then the implicit SRS bit (SRS_iIE) is also set. Alternatively, the value of that NDI bit can be compared to its previous value, such that a change in value (a toggle) sets the implicit SRS bit.

For two-codeword transmission, the redundancies in the codepoint definitions described above may be used to derive the implicit bit. For example, if the PIF signals any of codepoints 0 to 28, then the implicit bit is equal to a first value (e.g., SRS_iIE=0). If the PIF instead signals a codepoint from 29 to 57, then the implicit bit is equal to the opposite value (e.g., SRS_iIE=1).

It will be appreciated that the combination of the implicit SRS bit (SRS_iIE) defined above (or defined by a similar function) and one or more explicit SRS bits (SRS_eIE) and/or other implicit SRS bits can be mapped to a set of available SRS configurations in any manner.

It is also observed here that a new data indication for a given transport block is signaled by toggling the corresponding NDI bit. The function above takes advantage of the unused NDI bit in the event of single-codeword transmission. As suggested above, embodiments of the invention include both the case where the implicit signaling of SRS_iIE is associated to a specific value for such a bit and the case where the implicit signaling of SRS_iIE is associated to a transition (toggling) of the value for such a bit.

In the case of multi-codeword transmission, various embodiments of the invention take advantage of some redundancies in the signaling of the joint TPMI/TRI PIF. In particular, SRS_iIE is jointly encoded with the PIF only in case of multi-codeword transmission (i.e., when no transport block is deselected). In the case of single-codeword transmission, SRS_iIE is not jointly encoded with PIF, thus avoiding an increase of the PIF length.

For further clarification, an example of the PIF fields for 2 and 4 tx antennas is included in tables 3 and 4, reflecting certain embodiments of the invention as previously described. Table 2 illustrates the number of bits used for the precoding information field (PIF), for each of the two- and four-antenna cases.

TABLE 1

Number of bits for PIF.

| Number of antenna ports at UE | Number of bits for precoding information |
|---|---|
| 2 | 3 |
| 4 | 6 |

Table 3 illustrates the details of the PIF encoding for the two-antenna UE, and illustrates the value (or the derivation) of the implicit SRS_iIE bit for each codepoint. Importantly, this implicit bit is not transmitted, but is derived from the signaled bits in the PIF field or the NDI indicator, depending on whether one-codeword or two-codeword transmission is involved.

TABLE 3

Content of PIF for 2 antenna ports

| | One codeword: Codeword 0 enabled Codeword 1 disabled | | | Two codewords: Codeword 0 enabled Codeword 1 enabled | |
|---|---|---|---|---|---|
| Bit field mapped to index | Message | SRS_iIE | Bit field mapped to index | Message | SRS_iIE |
| 0 | 1 layer: TPMI = 0 | From the NDI of the deselected TB | 0 | 2 layers: TPMI = 0 | 0 |
| 1 | 1 layer: TPMI = 1 | From the NDI of the deselected TB | 1 | 2 layers: TPMI = 0 | 1 |
| 2 | 1 layer: TPMI = 2 | From the NDI of the deselected TB | 2-7 | reserved | reserved |
| ... | ... | ... | | | |
| 5 | 1 layer: TPMI = 5 | From the NDI of the deselected TB | | | |
| 6-7 | reserved | reserved | | | |

Similarly, Table 4 illustrates the details of the PIF encoding for the four-antenna UE, and illustrates the value (or the derivation) of the implicit SRS_iIE bit for each codepoint. Importantly, this implicit bit is not transmitted, but is derived from the signaled bits in the PIF field or the NDI indicator, depending on whether one-codeword or two-codeword transmission is involved.

TABLE 4

Content of PIF for 4 antenna ports

| | One codeword: Codeword 0 enabled Codeword 1 disabled | | | Two codewords: Codeword 0 enabled Codeword 1 enabled | |
|---|---|---|---|---|---|
| Bit field mapped to index | Message | SRS_iIE | Bit field mapped to index | Message | SRS_iIE |
| 0 | 1 layer: TPMI = 0 | From NDI of deselected TB | 0 | 2 layers: TPMI = 0 | 0 |

TABLE 4-continued

Content of PIF for 4 antenna ports

| | One codeword:<br>Codeword 0 enabled<br>Codeword 1 disabled | | | Two codewords:<br>Codeword 0 enabled<br>Codeword 1 enabled | |
| --- | --- | --- | --- | --- | --- |
| Bit field mapped to index | Message | SRS_iIE | Bit field mapped to index | Message | SRS_iIE |
| 1 | 1 layer:<br>TPMI = 1 | From NDI of deselected TB | 1 | 2 layers:<br>TPMI = 1 | 0 |
| ... | ... | ... | ... | ... | ... |
| 23 | 1 layer:<br>TPMI = 23 | From NDI of deselected TB | 15 | 2 layers:<br>TPMI = 15 | 0 |
| 24 | 2 layers:<br>TPMI = 0 | From NDI of deselected TB | 16 | 3 layers:<br>TPMI = 0 | 0 |
| 25 | 2 layers:<br>TPMI = 1 | From NDI of deselected TB | 17 | 3 layers:<br>TPMI = 1 | 0 |
| ... | ... | ... | ... | ... | ... |
| 39 | 2 layers:<br>TPMI = 15 | From NDI of deselected TB | 27 | 3 layers:<br>TPMI = 11 | 0 |
| 40-63 | reserved | reserved | 28 | 4 layers:<br>TPMI = 0 | 0 |
| | | | 29 | 2 layers:<br>TPMI = 0 | 1 |
| | | | 30 | 2 layers:<br>TPMI = 1 | 1 |
| | | | ... | ... | ... |
| | | | 44 | 2 layers:<br>TPMI = 15 | 1 |
| | | | 45 | 3 layers:<br>TPMI = 0 | 1 |
| | | | 46 | 3 layers:<br>TPMI = 1 | 1 |
| | | | ... | ... | ... |
| | | | 56 | 3 layers:<br>TPMI = 11 | 1 |
| | | | 57 | 4 layers:<br>TPMI = 0 | 1 |
| | | | 58-63 | Reserved | reserved |

In other embodiments of the invention, two (or more) explicit SRS bits (e.g., SRS_eIE1 and SRS_eIE2) are present. In this case, the implicit SRS signaling bit SRS_iIE forms an extended SRS signaling information element, allowing greater flexibility in configuring SRS. For example, when an implicit SRS signaling bit is used in conjunction with two explicit SRS signaling bits, dynamic signaling of up to 8 SRS configurations through DCI-4 is possible.

In still other embodiments of the invention, the implicit SRS signaling bit SRS_iIE is associated to a specific SRS-related parameter, which is thus implicitly signaled and does not need to be explicitly defined in (at least some of) the configurations signaled by the explicit SRS bits in DCI-4. As an example, the implicit SRS bit may be linked to signaling of one out of two possible allocation bandwidths for SRS. In another example, SRS_iIE is linked to the SRS "transmission comb" selection, i.e., the selection of one out of two pre-defined mapping rules for mapping SRS onto the subcarriers of the UE.

In still other embodiments, an implicit bit signaled according to the previously described techniques may be used for other purposes. Some of these purposes may be to signal other SRS-related parameters. Examples of SRS-related parameters that may be alternatively signaled by the implicit SRS bit include: a starting physical resource block assignment $n_{RRC}$; an SRS transmission duration, e.g., a single or indefinite transmission; an srs-ConfigIndex ISRS for SRS periodicity and SRS subframe offset $T_{offset}$; a frequency hopping bandwidth, $b_{hop}$; a cyclic shift $n_{SRS}^{cs}$; and a number of antenna ports. The 3GPP document 3GPP R1-106556, "Introduction of Rel-10 LTE-Advanced features in 36.212," may be consulted for a detailed description of each of these parameters.

Although the discussion above has focused on the application of signaling SRS-related configuration information, it should be appreciated that the techniques described above for defining an implicit bit SRS_iIE may be alternatively exploited to signal information for the configuration of other transmission parameters related, e.g., to scheduling, resources allocation, multi-antenna transmission configuration, etc.

Furthermore, while the above examples have been produced by considering DCI-4 as the baseline solution, the principles of these techniques are general to other DCI formats and can be readily applied to other signaling protocols with similar characteristics as DCI-4. For the same reason the techniques can be applied to both uplink and downlink signaling and can be employed to signal both uplink and downlink SRS, if available.

Finally, it should be noted that only a subset of the information elements belonging to DCI-4 have been discussed above, as a complete description of the information elements is unnecessary to a complete understanding of the inventive techniques described herein. Those skilled in the art will appreciate that a thorough description of the existing and proposed features of the PDCCH and the various DCI formats may be obtained from the relevant 3GPP standards, e.g., 3GPP TS 36.212 and 3GPP TS 36.213, and the documentation accompanying the updating of those standards for Release 10.

Figure 6:
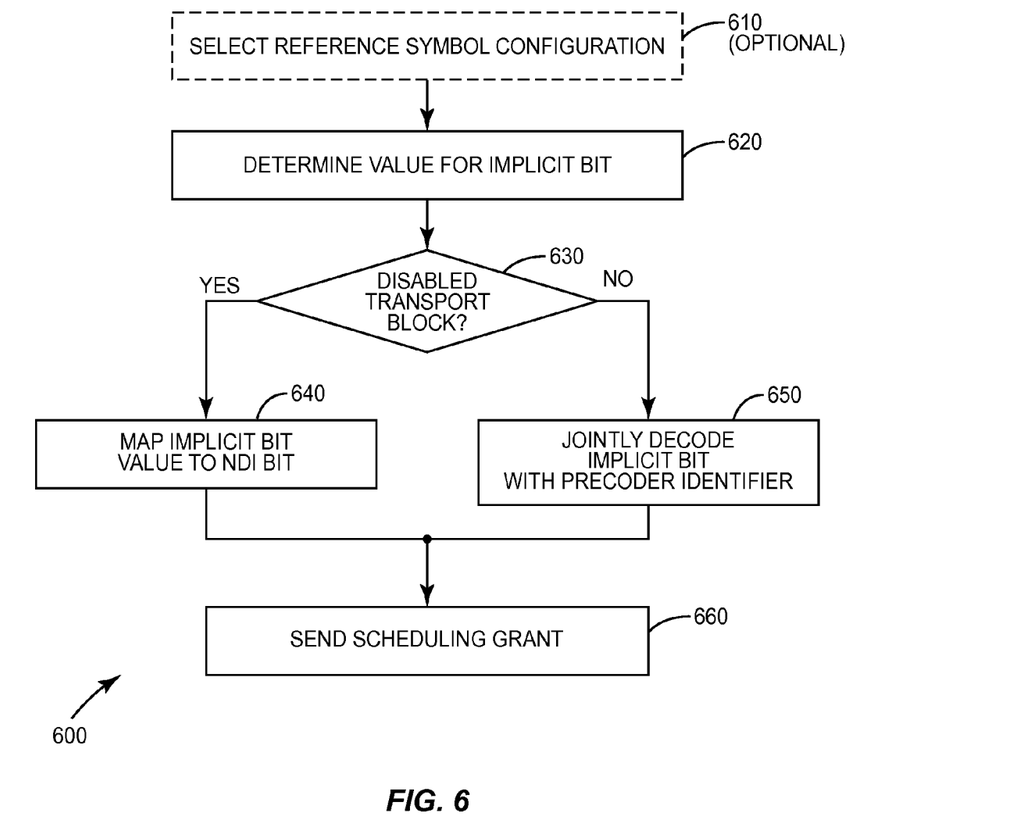
FIG. 6 is a process flow diagram illustrating a method for signaling control information in a wireless communication network.
Figure 7:
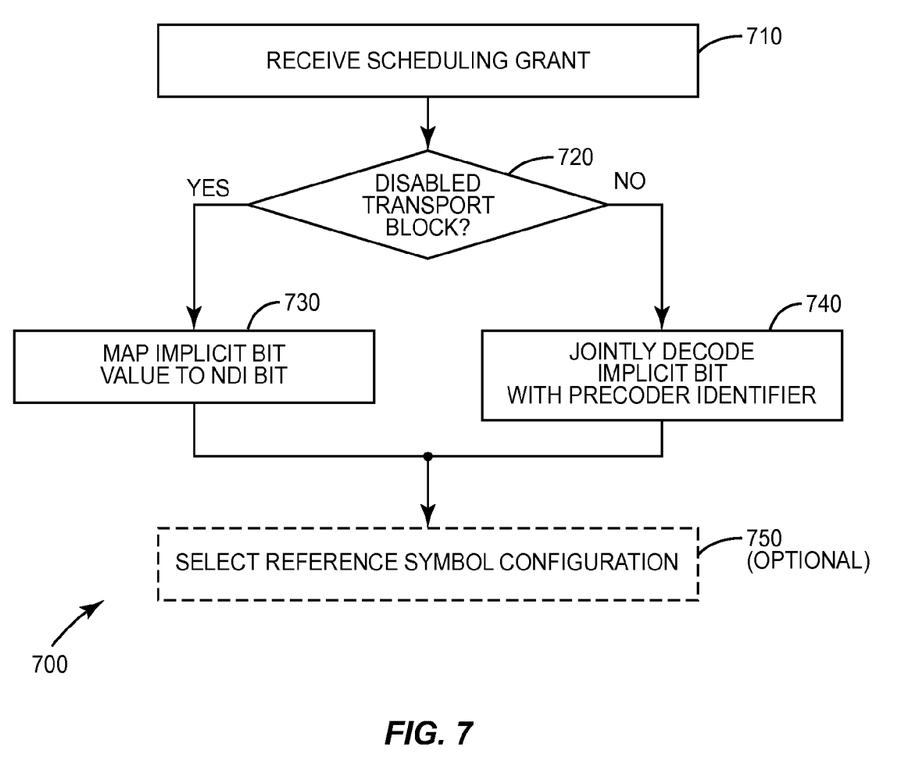
FIG. 7 is a process flow diagram illustrating another method for signaling control information in a wireless communication network.

In the above discussion, a detailed and complete solution for the encoding of an implicit signaling bit, such as might be used to signal SRS-related information, has been provided for the LTE-Advanced wireless system. FIGS. 6 and 7 illustrate the general features of example processes for signaling an implicit bit, such as might be implemented in the LTE-Advanced system or in other systems.

FIG. 6 illustrates a method for signaling control information that can be implemented in a network node, such as an eNodeB, which is configured to receive data transmissions from a remote device, such as a UE, according to scheduling grant messages transmitted to the remote device.

The illustrated method 600 begins, as shown at block 610, with the selection of a reference symbol configuration, such as a configuration for sounding reference signals. The reference symbol configuration may comprise a plurality of parameters defining a reference symbol transmission by the remote device. This step is illustrated as optional because the signaling technique is not limited to the signaling of reference symbol configuration information—as noted above, the implicit signaling bit transmitted according to these techniques may be used for any number of different purposes.

In any case, the technique continues with the determination of a value for an implicit signaling bit, as shown in block 620. This implicit bit value may be determined, for example, from the reference symbol configuration selected in 610. In one example, there are eight predetermined reference symbol configurations from which one is selected—this requires the signaling of three bits to the remote device. One of these three bits is designated as the implicit signaling bit, while the remaining two are explicitly signaled. In some systems, the set of possible reference symbol configurations may be predetermined by higher layer signaling, to select the set of reference symbol configurations to be available at any given time from an even larger set of possible configurations.

In another example, the implicit bit value is determined directly from a particular reference symbol configuration parameter, such as a transmission comb selection for the reference symbol transmission, a starting physical resource block assignment for the reference symbol transmission, a duration for the transmission, an index value corresponding to a periodicity and/or subframe offset for the transmission, a frequency hopping bandwidth for the reference symbol transmission, a cyclic shift for the reference symbol transmission, and a number of transmitter antenna ports for the reference symbol transmission.

As shown at block 630, the precise technique for signaling the implicit bit depends on whether one of the two (or more) possible transport blocks is to be disabled by the upcoming scheduling grant message. If so, then one of the new-data-indicator (NDI) bits in the scheduling grant message is unused, and can be used instead for signaling the implicit bit value. Thus, as shown at block 640, the implicit bit value is mapped to the otherwise unused NDI bit. It should be noted that this mapping can be direct, such that the NDI takes on the value (or the inverse value) of the implicit bit. This mapping can instead be indirect, such as when the NDI bit is toggled, relative to a prior value, to indicate one value of the implicit bit, and left the same to indicate the opposite value.

If, on the other hand, a transport block is not to be disabled by the upcoming scheduling grant message, a different technique is used to signal the implicit bit. In this case, as shown at block 650, the implicit bit is jointly encoded with a precoder matrix identifier (PMI), to take advantage of otherwise unused codepoints in the coding of the PMI.

Finally, as shown at block 660, the scheduling grant message is sent to the remote device for decoding of the implicit bit. Because the remote device can determine from the scheduling grant whether a transport block was disabled or not, the remote device can easily reverse the implicit bit encoding process to recover the implicit signaling bit.

An example process for decoding the implicit bit from the scheduling grant message is shown in FIG. 7. This process might be implemented in a network node, such as an LTE UE, which is configured to transmit data to a remote device, such as an eNodeB, according to scheduling grant messages received at the network node from the remote device.

As shown at block 710, the process 700 begins with the receipt of a scheduling grant message. As discussed in detail above, this scheduling grant message may comprise scheduling information formatted according to the downlink control information (DCI) Format 4, specified by the 3GPP standards. However, the technique illustrated in FIG. 7 is by no means limited to that particular format.

Next, the network node determines, from the scheduling grant message, whether the transmission of one of two (or more) possible transport blocks is disabled. This is shown at block 720. One possible technique for signaling the disabling of a transport block was discussed in detail above, in the specific context of LTE. Other techniques are also possible, whether involving the use of a dedicated explicit signaling bit or the use of jointly coded information.

As shown at block 730, if a transport block is disabled, then the value of the implicit bit is mapped from the new-data-indicator (NDI) bit corresponding to the disabled transport block. As discussed before, the value of the NDI bit may map directly to the implicit signaling bit value, in some cases, while in other cases the value of the implicit bit depends on whether the NDI bit value has been toggled relative to its previous value.

If no transport block is disabled, on the other hand, then the implicit bit is derived from the precoder identifier field of the scheduling grant, as shown at block 640. In this case, the implicit bit has been jointly coded with the precoder matrix identifier.

Finally, as shown at block 750, the implicit bit value is used to select a reference symbol configuration. Again, this step is shown as optional in FIG. 7 because the signaling technique is not limited to the signaling of reference symbol configuration information. However, if the implicit bit is used for the selection of a reference symbol configuration, it may be done in several ways. For instance, the reference symbol configuration may be selected from a pre-determined set of reference symbol configurations, each corresponding to an index of at least two bits, where the implicit signaling bits corresponds to one of those bits. In some cases, the pre-determined set of reference symbol configurations may have been determined earlier, via higher layer control signaling from the remote device.

In other embodiments, the implicit signaling bit may instead be used to more directly select a particular reference symbol configuration parameter. This parameter might be one of the following, for example: a transmission comb selection for the reference symbol transmission; a starting physical resource block assignment for the reference symbol transmission; a duration for the reference symbol transmission; an index value corresponding to a periodicity and subframe offset for the reference symbol transmission; a frequency hopping bandwidth for the reference symbol transmission; a cyclic shift for the reference symbol; and a number of transmitter antenna ports for the reference symbol transmission.

As noted earlier, either of the processes illustrated in FIGS. 6 and 7, or their many variants, may be implemented in a 3GPP LTE-Advanced network. Further, either of these processes and their variants may be implemented in a wireless transceiver like the one illustrated in FIG. 2, whether in a mobile station such as an LTE UE or in a base station such as an LTE eNodeB. In such implementations, the techniques will often be carried out by a programmable processing circuit comprising a processor and a memory, the memory configured with program instructions for carrying out one or more of the specific signaling techniques described above. Of course, hardware embodiments of these techniques are not limited to the specific configuration illustrated in FIG. 2, since those skilled in the art will be well aware of other possible arrangements of configurable processing units for use with radio devices in wireless communication systems.

Thus, examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention.

What is claimed is:

1. A method for signaling control information in a wireless communication network, the method comprising, in a network node configured to receive data transmissions from a remote device according to scheduling grant messages transmitted to the remote device:
   determining the value of an implicit signaling bit; and
   signaling the implicit signaling bit to the remote device in a scheduling grant message, by mapping the implicit signaling bit to a new-data-indicator bit corresponding to a disabled transport block when one of a plurality of transport blocks available for scheduling is disabled and otherwise jointly encoding the implicit signaling bit with a precoding matrix identifier.

2. The method of claim 1:
wherein the method further comprises first selecting a reference symbol configuration, the reference symbol configuration comprising a plurality of parameters defining a reference symbol transmission by the remote device; and
wherein the value of the implicit signaling bit is based on the selected reference symbol configuration.

3. The method of claim 2, wherein the reference symbol configuration is selected from a pre-determined set of reference symbol configurations, each corresponding to an index of at least two bits, and wherein the value of the implicit signaling bit is set to equal the value of a pre-determined one of the at least two bits corresponding to the selected reference symbol configuration.

4. The method of claim 3, the method further comprising first establishing the pre-determined set of reference symbol configurations with the remote device via control signaling.

5. The method of claim 2, wherein the implicit signaling bit is determined based on a reference symbol configuration parameter selected from the following:
a transmission comb selection for the reference symbol transmission;
a starting physical resource block assignment for the reference symbol transmission;
a duration for the reference symbol transmission;
an index value corresponding to a periodicity and subframe offset for the reference symbol transmission;
a frequency hopping bandwidth for the reference symbol transmission;
a cyclic shift for the reference symbol; and
a number of transmitter antenna ports for the reference symbol transmission.

6. The method of claim 1, wherein mapping the implicit signaling bit to a new-data-indicator bit corresponding to a disabled transport block comprises setting the new-data-indicator bit to a first value for a first value of the implicit signaling bit and to a second value for a second value of the implicit signaling bit.

7. The method of claim 1, wherein mapping the implicit signaling bit to a new-data-indicator bit corresponding to a disabled transport block comprises toggling the value of the new-data-indicator bit based on the value of the implicit signaling bit.

8. The method of claim 1, wherein the wireless communication network is a 3GPP LTE-Advanced network, and wherein the scheduling grant message is a DCI Format 4 message.

9. A method for signaling control information in a wireless communication network, the method comprising, in a network node configured to transmit data to a remote device according to scheduling grant messages received from the remote device:
receiving a scheduling grant message from the remote device; and
determining the value of an implicit signaling bit from the scheduling grant message by mapping the implicit signaling bit from a new-data-indicator bit corresponding to a disabled transport block, when the scheduling grant message indicates that one of a plurality of transport blocks available for scheduling is disabled, and otherwise jointly decoding the implicit signaling bit and a precoding matrix identifier from a pre-determined field of the scheduling grant message.

10. The method of claim 9, further comprising initiating transmission of a reference signal in response to decoding a first pre-determined value for the implicit signaling bit.

11. The method of claim 9, further comprising using the value of the implicit signaling bit to determine a reference symbol configuration, the reference symbol configuration comprising a plurality of parameters defining a reference symbol transmission by the network node.

12. The method of claim 11, wherein the reference symbol configuration is selected from a pre-determined set of reference symbol configurations, each corresponding to an index of at least two bits, and wherein the implicit signaling bit corresponds to a pre-determined one of the at least two bits.

13. The method of claim 12, the method further comprising first establishing the pre-determined set of reference symbol configurations with the remote device via control signaling.

14. The method of claim 11, further comprising using the value of the implicit signaling bit to determine a reference symbol configuration parameter selected from the following:
a transmission comb selection for the reference symbol transmission;
a starting physical resource block assignment for the reference symbol transmission;
a duration for the reference symbol transmission;
an index value corresponding to a periodicity and subframe offset for the reference symbol transmission;
a frequency hopping bandwidth for the reference symbol transmission;
a cyclic shift for the reference symbol; and
a number of transmitter antenna ports for the reference symbol transmission.

15. The method of claim 9, wherein mapping the implicit signaling bit from a new-data-indicator bit corresponding to a disabled transport block comprises setting the value of the implicit signaling bit to a first value for a first value of new-data-indicator bit and to a second value for a second value of the new-data-indicator bit.

16. The method of claim 9, wherein mapping the implicit signaling from to a new-data-indicator bit corresponding to a disabled transport block comprises setting the value of the implicit signaling bit based on whether the value of the new-data-indicator bit has been toggled.

17. The method of claim 9, wherein the wireless communication network is a 3GPP LTE-Advanced network, and wherein the scheduling grant message is a DCI Format 4 message.

18. A device in a wireless communication network comprising
a radio configured to transmit scheduling grant messages to a remote device and to receive reference symbol transmissions from the remote device, and
processing circuits configured to:
determine the value of an implicit signaling bit; and
signal the implicit signaling bit to the remote device in a scheduling grant message, by mapping the implicit signaling bit to a new-data-indicator bit corresponding to a disabled transport block when one of a plurality of transport blocks available for scheduling is disabled and otherwise jointly encoding the implicit signaling bit with a precoding matrix identifier.

19. The device of claim 18, wherein the device is a radio base station that includes the radio and processing circuits.

20. The device of claim 18, wherein the processing circuits are further configured to first select a reference symbol configuration, the reference symbol configuration comprising a plurality of parameters defining a reference symbol transmission by the remote device, and wherein the value of the implicit signaling bit is based on the selected reference symbol configuration.

21. The device of claim 20, wherein the processing circuits are configured to select the reference symbol configuration from a pre-determined set of reference symbol configurations, each corresponding to an index of at least two bits, and to set the value of the implicit signaling bit to equal the value of a pre-determined one of the at least two bits corresponding to the selected reference symbol configuration.

22. The device of claim 21, wherein the processing circuits are configured to first establish the pre-determined set of reference symbol configurations with the remote device via control signaling.

23. The device of claim 20, wherein the implicit signaling bit is determined based on a reference symbol configuration parameter selected from the following:
  a transmission comb selection for the reference symbol transmission;
  a starting physical resource block assignment for the reference symbol transmission;
  a duration for the reference symbol transmission;
  an index value corresponding to a periodicity and subframe offset for the reference symbol transmission;
  a frequency hopping bandwidth for the reference symbol transmission;
  a cyclic shift for the reference symbol; and
  a number of transmitter antenna ports for the reference symbol transmission.

24. The device of claim 18, wherein mapping the implicit signaling bit to a new-data-indicator bit corresponding to a disabled transport block comprises setting the new-data-indicator bit to a first value for a first value of the implicit signaling bit and to a second value for a second value of the implicit signaling bit.

25. The device of claim 18, wherein mapping the implicit signaling bit to a new-data-indicator bit corresponding to a disabled transport block comprises toggling the value of the new-data-indicator bit based on the value of the implicit signaling bit.

26. The device of claim 25, wherein the processing circuits are further configured to initiate transmission of a reference signal, via the radio, in response to decoding a first pre-determined value for the implicit signaling bit.

27. A device in a wireless communication network comprising
  a radio configured to receive scheduling grant messages from a remote device and to transmit reference symbol transmissions to the remote device, and
  processing circuits configured to:
    receive a scheduling grant message from the remote device; and
    determine the value of an implicit signaling bit from the scheduling grant message by mapping the implicit signaling bit from a new-data-indicator bit corresponding to a disabled transport block, when the scheduling grant message indicates that one of a plurality of transport blocks available for scheduling is disabled, and otherwise jointly decoding the implicit signaling bit and a precoding matrix identifier from a pre-determined field of the scheduling grant message.

28. The device of claim 27, wherein the device is a mobile station that includes the radio and processing circuits.

29. The device of claim 27, wherein the processing circuits are further configured to use the value of the implicit signaling bit to determine a reference symbol configuration, the reference symbol configuration comprising a plurality of parameters defining a reference symbol transmission by the network node.

30. The device of claim 29, wherein the processing circuits are configured to select the reference symbol configuration from a pre-determined set of reference symbol configurations, each corresponding to an index of at least two bits, and wherein the implicit signaling bit corresponds to a pre-determined one of the at least two bits.

31. The device of claim 30, wherein the processing circuits are further configured to first establish the pre-determined set of reference symbol configurations with the remote device via control signaling.

32. The device of claim 29, wherein the processing circuits are configured to use the value of the implicit signaling bit to determine a reference symbol configuration parameter selected from the following:
  a transmission comb selection for the reference symbol transmission;
  a starting physical resource block assignment for the reference symbol transmission;
  a duration for the reference symbol transmission;
  an index value corresponding to a periodicity and subframe offset for the reference symbol transmission;
  a frequency hopping bandwidth for the reference symbol transmission;
  a cyclic shift for the reference symbol; and
  a number of transmitter antenna ports for the reference symbol transmission.

33. The device of claim 27, wherein mapping the implicit signaling bit from a new-data-indicator bit corresponding to a disabled transport block comprises setting the value of the implicit signaling bit to a first value for a first value of new-data-indicator bit and to a second value for a second value of the new-data-indicator bit.

34. The device of claim 27, wherein mapping the implicit signaling from to a new-data-indicator bit corresponding to a disabled transport block comprises setting the value of the implicit signaling bit based on whether the value of the new-data-indicator bit has been toggled.

* * * * *

UNITED STATES PATENT AND TRADEMARK OFFICE
CERTIFICATE OF CORRECTION

PATENT NO. : 8,488,529 B2  Page 1 of 1
APPLICATION NO. : 13/152533
DATED : July 16, 2013
INVENTOR(S) : Sorrentino It is certified that error appears in the above-identified patent and that said Letters Patent is hereby corrected as shown below:

In the Specification

In Column 12, Line 35, delete "(TPMI=0.5)." and insert -- (TPMI=0..5). --, therefor.

In the Claims

In Column 20, Line 40, in Claim 16, delete "from to a" and insert -- from a --, therefor.

In Column 22, Line 51, in Claim 34, delete "from to a" and insert -- from a --, therefor.

Signed and Sealed this
Thirty-first Day of December, 2013

Margaret A. Focarino
*Commissioner for Patents of the United States Patent and Trademark Office*